United States Patent [19]

Kippelt et al.

[11] Patent Number: 5,279,040
[45] Date of Patent: Jan. 18, 1994

[54] FLUID-BASED ACCELERATION AND TILT SENSOR

[75] Inventors: Ulrich Kippelt, Eningen; Botho Ziegenbein, Reutlingen; Günther Stecher, Ludwigsburg, all of Fed. Rep. of Germany

[73] Assignee: Robert Bosch GmbH, Stuttgart, Fed. Rep. of Germany

[21] Appl. No.: 896,898

[22] Filed: Jun. 10, 1992

Related U.S. Application Data

[63] Continuation of Ser. No. 701,210, May 16, 1991, abandoned.

[30] Foreign Application Priority Data

May 18, 1990 [DE] Fed. Rep. of Germany ....... 4016032

[51] Int. Cl.$^5$ .............................................. G01C 9/18
[52] U.S. Cl. ......................................... 33/366; 33/377; 338/44
[58] Field of Search ................. 33/366, 377, 300, 343; 73/204.25; 338/22R, 225.D, 27, 36, 38, 44, 80, 92, 94, 222

[56] References Cited

U.S. PATENT DOCUMENTS

| | | | |
|---|---|---|---|
| 3,114,209 | 12/1963 | Foody et al. | 33/206 |
| 3,241,374 | 3/1966 | Menkis | 33/365 |
| 3,247,723 | 4/1966 | Yaune | 33/366 |
| 4,382,247 | 5/1983 | Stecher et al. | 338/42 |
| 4,410,872 | 10/1983 | Stecher et al. | 338/114 |
| 4,583,296 | 4/1986 | Dell'Acqua | 33/366 |
| 4,609,913 | 9/1986 | Arbogast et al. | 338/23 |
| 4,779,353 | 10/1988 | Lopes et al. | 33/366 |
| 5,153,556 | 10/1992 | Hecht | 330/25 |

FOREIGN PATENT DOCUMENTS

| | | | |
|---|---|---|---|
| 0265682 | 3/1989 | Fed. Rep. of Germany | 33/366 |
| 0708149 | 1/1980 | U.S.S.R. | 33/377 |
| 1303814 | 4/1987 | U.S.S.R. | 33/366 |
| 1434253 | 10/1988 | U.S.S.R. | 33/366 |
| 1542632 | 3/1979 | United Kingdom | 33/366 |
| 2110374 | 6/1983 | United Kingdom | 33/366 |
| 2112524 | 7/1983 | United Kingdom | 33/366 |
| 2188427 | 2/1987 | United Kingdom | 33/366 |

OTHER PUBLICATIONS

Charles A. Harper, *Handbook of Thick Film Hybrid Microelectronics* chapter 6, "Resistor Materials, Processing & Controls", pp. 6–1 through 6–47.

*Primary Examiner*—William A. Cuchlinski, Jr.
*Assistant Examiner*—Alvin Wirthlin
*Attorney, Agent, or Firm*—Frishauf, Holtz, Goodman & Woodward

[57] ABSTRACT

A sensor (10) for measurement of acceleration and/or tilt of a movable object, particularly a motor vehicle, features an interior space (12) partially filled with fluid (15). Within that space, at least two heatable, temperature-sensitive electrical circuit elements are arranged so that, in a rest or initial position of the sensor, they are equally covered or wetted by the fluid. If the acceleration and tilt of the movable object are both zero, or the two cancel each other out, the sensor reading is zero. If this is not the case, the acceleration or tilt leads to a differing degree of coverage or wetting of the at least two circuit elements, and thus to a non-zero sensor reading.

6 Claims, 3 Drawing Sheets

FLUID-BASED ACCELERATION AND TILT SENSOR

This application is a continuation of application Ser. No. 07/701,210, filed May 16, 1991, now abandoned.

Cross-reference to related patent and applications, assigned to Robert Bosch GmbH, assignee of the present application, the disclosures of which are hereby incorporated by reference:

U.S. Pat. No. 4,955,234, MAREK, issued Sep. 11, 1990=DE 38 14 952, Ser. No. 07/631,623, MAREK, BANTIEN, HAACK & WARTH=DE 40 00 903, German Patent Disclosure DE 40 22 464.3, filed Jul. 14, 1990, and corresponding U.S. Ser. No. 07/716,817, MAREK, Jun. 17, 1991 910260 and corresponding U.S. Ser. No. 07/701,781, BANTIEN, May 17, 1991 German Patent Disclosure DE 40 16 472.1, and corresponding U.S. Ser. No. 07/701,880, BANTIEN & FINDLER, May 17, 1991 German Patent Disclosure DE 39 27 163 and corresponding International Application PCT/DE 90/00596, German Patent Disclosure DE 36 09 841, filed Mar. 22, 1986, and Published International Application WO 87/ 05569, HEINTZ et al.

CROSS-REFERENCE TO RELATED PATENT DOCUMENT

German Patent DE-PS 36 25 411, SEIDEL/MBB, issued May 11, 1988.

FIELD OF THE INVENTION

The present invention relates generally to fluid-based acceleration sensors and, more particularly, to an improved sensor in which bridge circuits are used to render readings insensitive to fluctuations in ambient temperature.

BACKGROUND

Prior German patent application P 39 39 410 and corresponding International Application PCT/DE 90/00862, now U.S. Ser. No. 07/839,757, filed Apr. 10, 1992, assigned to the assignee of the present application, disclose a thermo-sensitive acceleration and tilt sensor adapted for attachment to a movable object, particularly a motor vehicle.

A housing defines a rotation-symmetrical interior space or cavity which tapers down vertically in a conical shape. The space is filled by fluid up to an air bubble. On the cover plate of the inside of the housing, an ohmic resistance element is applied, which forms a part of an evaluation circuit of the sensor, in the form of a Wheatstone bridge circuit. The construction of the electrical element using thick-film technology, to make an electrically heatable and temperature-sensitive element, is described.

The mode of operation of the sensor is the heat-dissipation-mediated change in resistance of the ohmic resistance element, which is heated to a specified temperature.

In the rest position, the circuit element is in thermal contact with the air bubble in the interior space of the sensor. If the sensor is accelerated and/or tilted, the air bubble moves, and the fluid flows over the circuit element. The change in heat dissipation relationships lead to a change in the ohmic resistance of the circuit element, which in turn is detected by the evaluation circuit. This sensor is particularly well adapted for threshold value detection of tilt and acceleration of a movable object.

THE INVENTION

The sensor of the present invention, with its pair of spaced, differentially wetted, resistance elements, has the advantage that tilts and/or accelerations of a movable object can be particularly precisely measured. In the motor vehicle field, this is useful for installation not only for passenger protection in case of accidents, e.g. airbag triggering, but also for navigation systems. A further advantage of the present sensor, in contrast to mechanically-operating tilt and acceleration sensors, is that no friction-related hysteresis problems arise in the measurement process.

Briefly, the electrical resistance elements at opposing ends of the sensor interior space are connected in a bridge circuit, with one element from each end connected in each branch of the bridge circuit. A tap in the middle of each branch is used to detect any voltage difference arising from the fact that heat dissipation, and thus cooling, increase at the resistance elements with increasing fluid coverage and heat dissipation decreases at the resistance elements with decreasing fluid coverage. The output of the bridge circuit is relatively unaffected by ambient temperature changes because the temperature-vs-resistance characteristic curve of all four resistance elements is the same, and it is the resistance differences which are being evaluated by the detection circuit. The sensor can thus be used over a very broad temperature range, such as vehicles shipped to the tropics and to arctic regions. It is also advantageous that the output signal is insensitive to the particular fluid used in the sensor. Signal evaluation requires only a relatively inexpensive circuit.

A further advantage arises from the choice of ohmic resistance elements formed using thick-film technology as the electric circuit elements, and their placement on ceramic bubbles formed on the inside of the sensor interior space. The low thermal mass of the thick-film membranes, on which the resistance elements are placed, leads to an advantageous quick response time of the sensor. Further, cost-effective manufacture in hybrid technology is possible, and the evaluation circuit can be integrated along with the rest.

A still further advantage is that the measurement precision of the sensor can be varied in a simple manner, namely by changing the spacing between the resistance elements.

The damping behavior of the sensor, that is, how fast the output signal stabilizes after fluid sloshing, can be matched to various applications by adjusting the geometric dimensions of the interior space of the sensor and the viscosity of the fluid. Thicker, more viscous fluids slosh less readily.

It is particularly advantageous to put two resistors on opposing sides of the interior space of the sensor, and to connect them in a bridge circuit. An arrangement as shown in FIG. 3 increases the output signal of the sensor, and thus the sensitivity of the sensor. A further advantage of the circuit is that the output signal is independent of the ambient temperature. The manufacture of the resistance elements using thick-film technology and their arrangement permits advantageous possibilities with regard to tilt angle range and sensitivity.

DRAWINGS

FIG. 2c is a longitudinal cross-section of the sensor of FIG. 2a;

DETAILED DESCRIPTION

Figure 1A:
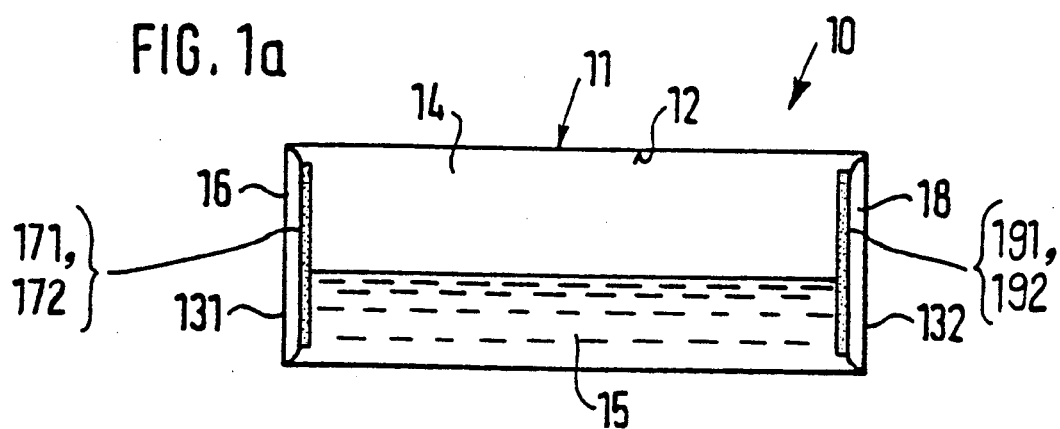
FIG 1a is a longitudinal cross-section of a sensor in a rest position.
Figure 1B:
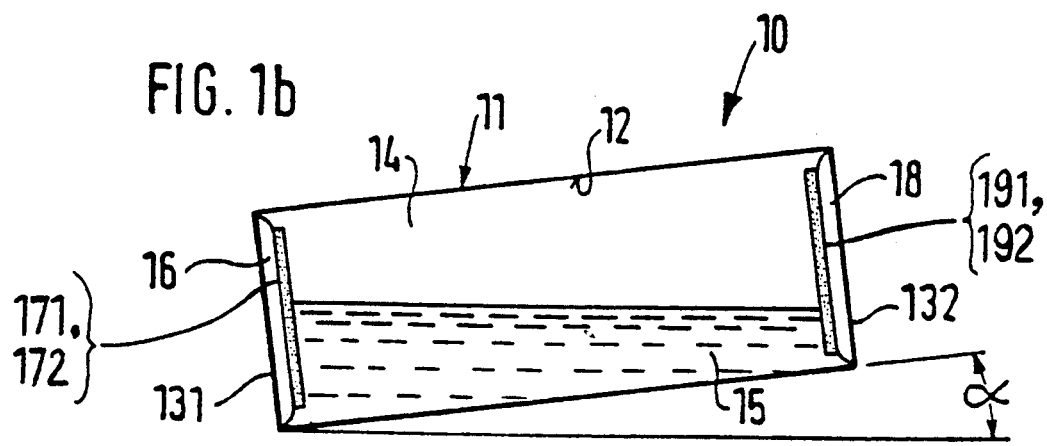
FIG. 1b illustrates the longitudinal cross-section of this sensor inclined by angle alpha with respect to the rest position.
Figure 1C:
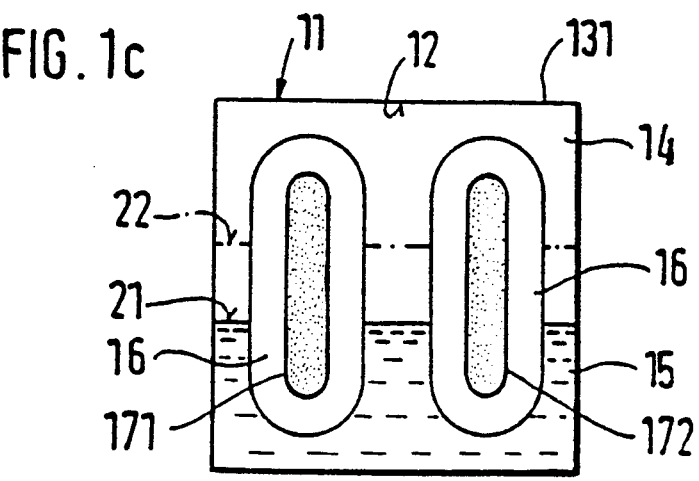
FIG. 1c is a plan view of a sidewall of this sensor.

FIGS. 1a–1c illustrate a sensor 10 with a housing 11 which defines an interior space 12. The housing may have a rectangular, cylindrical, or other suitable shape. Within space 12 of sensor 10, there are a gas 14 and a fluid 15, with a fluid surface defining the boundary between fluid 15 and gas 14.

Thick-film bubbles 16 and 18 bulge into space 12 from respective sidewalls 131 and 132 of housing 11. On each of sidewalls 131, 132, there may be located one or more thick-film bubbles 16, 18. In the preferred embodiment, integrated into each of the thick-film bubbles, there is a respective pair 171, 172 and 191, 192 of resistors, which can be electrically heated, and whose resistance changes with temperature.

FIG. 1a shows that in an initial position of sensor 10, in which the acceleration and the tilt are both zero, or when the acceleration and the tilt counterbalance each other, the resistances 171, 172 and 191, 192 are covered to equal extents by fluid 15. This means that, at both resistor pairs 171, 172 and 191, 192, the same thermal conduction or heat dissipation/transfer relationships prevail.

In contrast to FIG. 1a, which shows sensor 10 in its initial position, FIG. 1b shows sensor 10 tilted at angle alpha. In this case, the resistances 171, 172 are covered by more of fluid 15 than are resistances 191, 192. The heat transfer relationships at resistances 171, 172 and 191, 192 have, by comparison with the initial state or position, changed in opposite directions, which leads to opposing changes in the resistance values of resistances 171, 172 and 191, 192. The resistance change is dependent upon the tilt or inclination angle alpha and is detected by means of an evaluation circuit FIG. 1c is a plan view of the sidewall 131 of sensor 10. Sidewall 131's structure corresponds to that of opposing sidewall 132. The resistances 171 and 172 are each integrated into a thick-film bubble. They are so arranged that, in the rest position of sensor 10, they are equally covered and wetted by fluid 15. The fluid level in the rest position is indicated at 21, while 22 indicates the fluid level which prevails after the tilt or rotation through angle alpha shown in FIG. 1b.

Figure 2A:
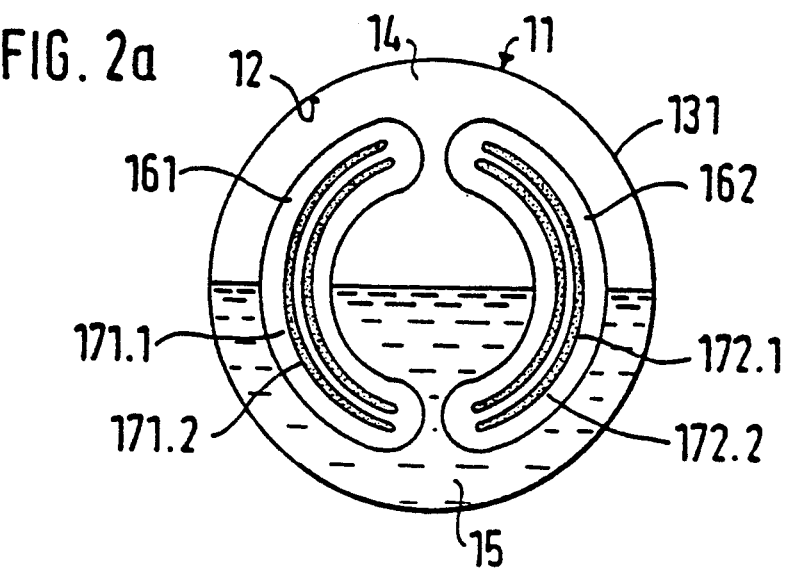
FIG. 2a is a plan view of a sidewall of an alternate embodiment of the sensor, in rest position.
Figure 2B:
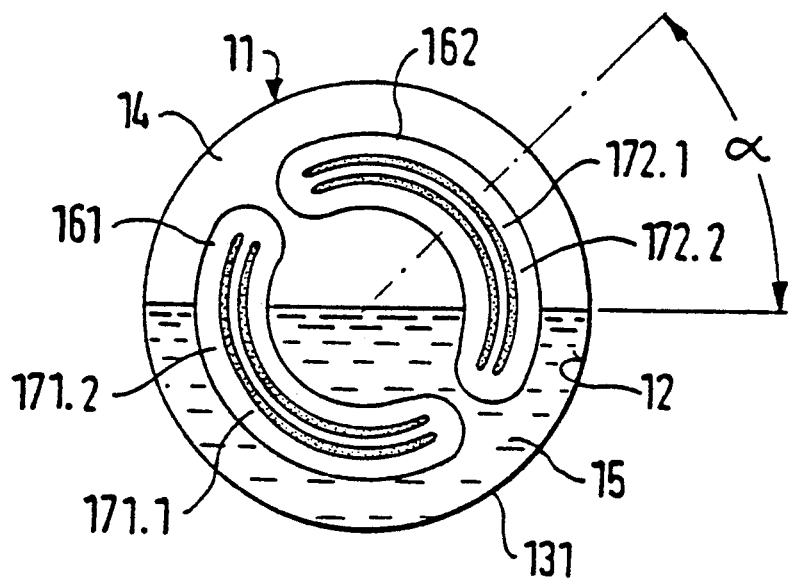
FIG. 2b is the sensor of FIG. 2a, rotated by an angle alpha about a central axis of the sensor.
Figure 2C:
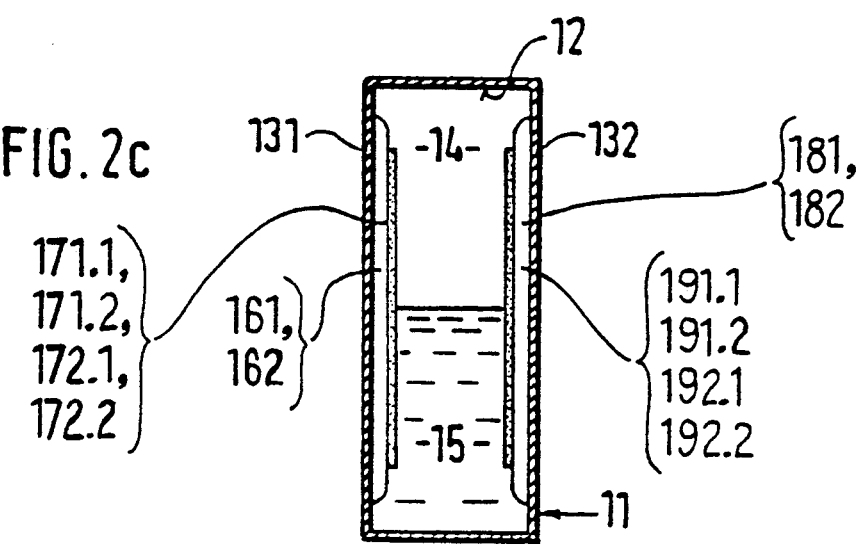

FIGS. 2a–2c illustrate an alternate embodiment, in which sensor 10 is cylindrical and sidewall 131 is circular. Opposing sidewall 132 has the same structure as sidewall 131. In this sensor, on each of the opposing sidewalls 131, 132, there are formed a pair of thick-film bubbles 161 and 162 on one sidewall, and a pair of thick film bubbles 181 and 182 on the opposing sidewall, preferably half-circular and oriented as though halves of the same circle. Into each of bubbles 161 and 162, there are integrated, respectively, two resistance elements 171.1, 171.2 and 172.1 and 172.2. As in the FIG. 1c embodiment, resistance elements 171.1, 171.2 and 172.1 and 172.2 are so arranged on sidewall 131 that, in the initial position of the sensor, they are equally covered and wetted by fluid 15. In this example, they are half-moon-shaped planar elements, oriented, in the rest position, perpendicular to the fluid surface. Thus, it is possible to detect both tilts in the direction of the sensor axis, and tilts with respect to an axis perpendicular thereto. Clever planar arrangement of the resistance elements on the sidewall makes the sensor especially sensitive. The functional operation of the sensor of FIGS. 2a–2c is based on the same principle as that of FIGS. 1a–1c.

In contrast to FIG. 1b, where the sensor is turned in the direction of an axis perpendicular to the sensor axis, FIG. 2b illustrates a sensor rotated about the sensor axis by angle alpha. Arrangement of four resistance elements 171.1, 171.2 and 172.1 and 172.2 on both sidewalls 131 and 132 of the sensor permits detection of such tilt angles also.

FIG. 2c is a longitudinal cross-section through the sensor. By appropriate selection of the distance between the sensing-resistance-equipped sidewalls 131 and 132, the sensitivity of the sensor, with respect to tilts about an axis perpendicular to the sensor axis, can be varied. The greater the distance, the higher the sensitivity. Further, the damping behavior of the sensor can be influenced by adjusting the geometric dimensions of the sensor interior space 12 and the viscosity of fluid 15.

Figure 3A:
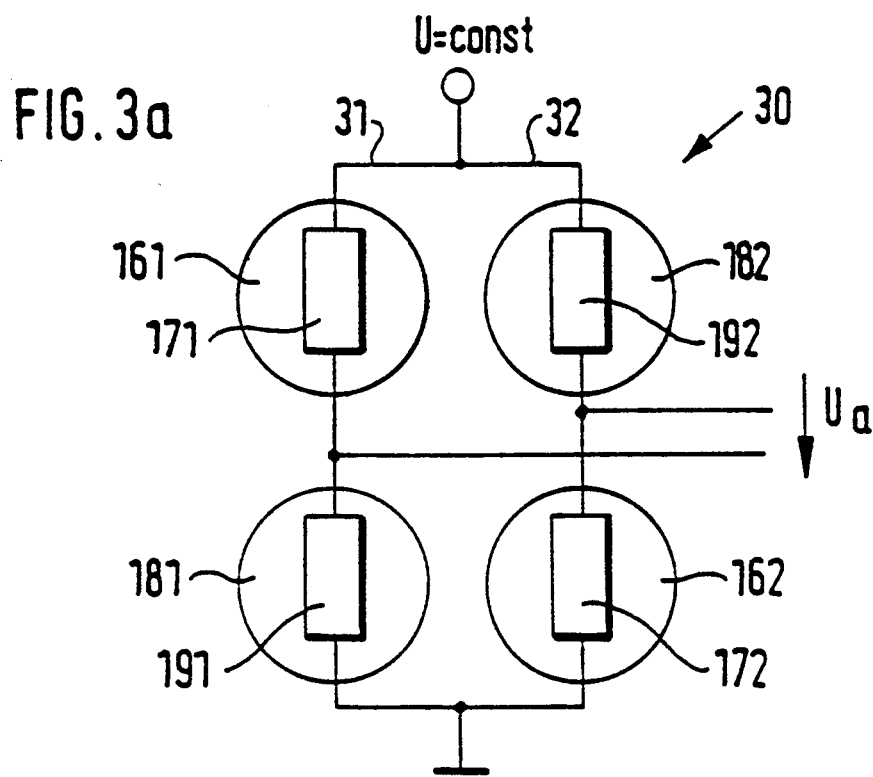
FIG. 3a is a circuit for the sensor of FIGS. 1a–c.

FIG. 3a schematically illustrates the principles of a sensor bridge circuit 30 for a sensor according to FIG. 1. The circuit consists essentially of two parallel-connected branches 31 and 32, in each of which there are connected, in series, one of the two resistances of sidewall 131 and one of the two resistances of sidewall 132, namely resistances 171 and 191 in branch 31, and resistances 192 and 172 in branch 32.

OPERATION

To both branches 31 and 32, there is applied a constant voltage U. Resistances 171, 172, 191, and 192 are heated by the current flowing through them. The resistance values of the resistances 171, 172, 191, and 192 are temperature-dependent. A measurement signal is derived from a voltage difference $U_a$ between two tapping points in the circuit. Tap point 1 is on branch 31 between resistances 171 and 191. Tap point 2 is on branch 32 between resistances 192 and 172. Voltage signal $U_a$ is exactly zero when resistance 191 behaves, with respect to resistance 171, just the same as resistance 172 behaves with respect to resistance 192.

Since resistances 171 and 172 are located on one sidewall 131 of sensor interior space 12 and resistances 191 and 192 are located on the other sidewall 132 of sensor interior space 12, and since the two resistances are arranged on the wall as desicribed with regard to FIG. 1c, a tilt of the sensor about an axis perpendicular to the sensor axis leads to counter-directed changes of the resistance relationships. This amplifies or increases the measurement signal $U_a$. Since all resistances of the sensor bridge circuit 30 are heated by the constant voltage U, since the characteristic of all the resistances upon change in ambient temperature varies identically, and since only temperature differences are evaluated by the circuit, the output measurement signal of this circuit is substantially unaffected by ambient temperature changes.

Figure 3B:
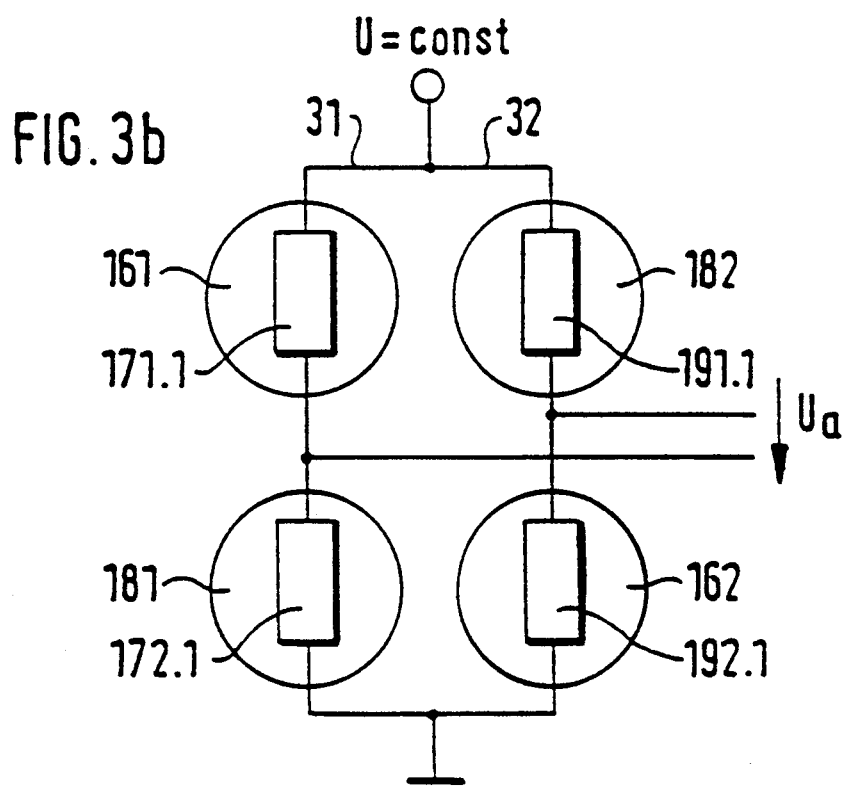
FIG. 3b is a circuit for the sensor of FIGS. 2a–c.

In order to detect the rotation shown in FIG. 2b about the sensor axis, four of the resistances arranged on the bubble structure must be connected in a second bridge circuit as shown schematically in FIG. 3b. Thus the counter-varying resistances 171.1 and 172.1 are series-connected in branch 31, while the corresponding resistances 191.1 and 192.1 are series-connected in branch 32. The evaluation of the measurement signal is carried out according to the same principle as that of the circuit depicted in FIG. 3a.

Various changes and modifications are possible within the scope of the inventive concept, and features of one of the foregoing embodiments may be combined with features of one or more other embodiments.

We claim:

1. Sensor (10) for detection of at least one of acceleration and tilt of a movable object, having
   a sensor housing (11) having opposing sidewalls defining an interior space (12);
   a fluid (15) partially filling said interior space (12);
   a bubble structure (16, 18) of ceramic material including a membrane formed by thick-film technology formed on each of said sidewalls in said interior space;
   at least two electrically heatable, temperature-sensitive electrical circuit elements forming part of an evaluation circuit;
   wherein
   said two temperature-sensitive electrical circuit elements are spaced apart, in said interior space (12) of the sensor;
   said temperature-sensitive elements are film resistance elements, formed on respective ceramic bubble structures (16, 18), whose resistances change as a function of degree of fluid coverage and resulting heat dissipation;
   said two elements are arranged such that, in a rest position of the sensor (10), they are equally wetted by said fluid (15), while when acceleration and tilt do not cancel each other out, such acceleration and tilt lead to a differing degree of wetting of said two elements by said fluid (15), and thus to a differing degree of heat dissipation, resulting in a resistance difference which is evaluated by said evaluation circuit.

2. Sensor according to claim 1, wherein
   said two electrical elements (17, 19) are heatable by passing an electrical current through them.

3. Sensor according to claim 2, wherein
   said sensor has a damping behavior which is a function of viscosity of said fluid (15) and of geometric dimensions of said interior space (12) of said sensor housing (11).

4. Sensor according to claim 1, wherein
   measuring sensitivity of said sensor is a function of spacing between said two electrical circuit elements arranged on said opposing sidewalls (131, 132) of said sensor (10).

5. Sensor according to claim 1, wherein
   said sensor has a damping behavior which is a function of viscosity of said fluid (15) and of geometric dimensions of said interior space (12) of said sensor housing (11).

6. Sensor according to claim 1, wherein
   two resistance elements (171, 172; 191, 192) are located on each of said sidewalls; and
   said resistance elements are connected in a bridge circuit.

* * * * *